United States Patent [19]

Fuller

[11] Patent Number: 4,976,343

[45] Date of Patent: Dec. 11, 1990

[54] ORDERING APPARATUS HAVING WALLS WITH POLYGONAL ROTATORS

[76] Inventor: Stuart C. Fuller, Rte. 2, Box 55, Goode, Va. 24556

[21] Appl. No.: 411,277

[22] Filed: Sep. 22, 1989

[51] Int. Cl.⁵ ................................................ B65G 47/12
[52] U.S. Cl. ....................................... 198/453; 198/454
[58] Field of Search ............... 198/447, 448, 452, 453, 198/454

[56] References Cited

U.S. PATENT DOCUMENTS

| 3,628,647 | 12/1971 | Beard | 198/454 |
| 3,934,706 | 1/1976 | Tice | 198/454 |
| 4,236,625 | 12/1980 | Smith et al. | 198/454 |

Primary Examiner—Joseph E. Valenza
Assistant Examiner—Keith L. Dixon

[57] ABSTRACT

Apparatus is provided for ordering a flow of randomly arranged cylindrical articles into a single file, featuring an article conveyor having guide walls composed of a plurality of polygonal rotators arranged in substantially vertical stands in superimposed rotating relationship, the rotators having substantially straight side walls joined together at corners with angles betweeen 60° and 150°, and preferably oriented to each other in the stand in nonaligned relation with corners projecting outwardly beyond side walls of other rotators in the stand, thereby imparting a rotational and vibrational movement to articles in contact with the rotators.

27 Claims, 14 Drawing Sheets

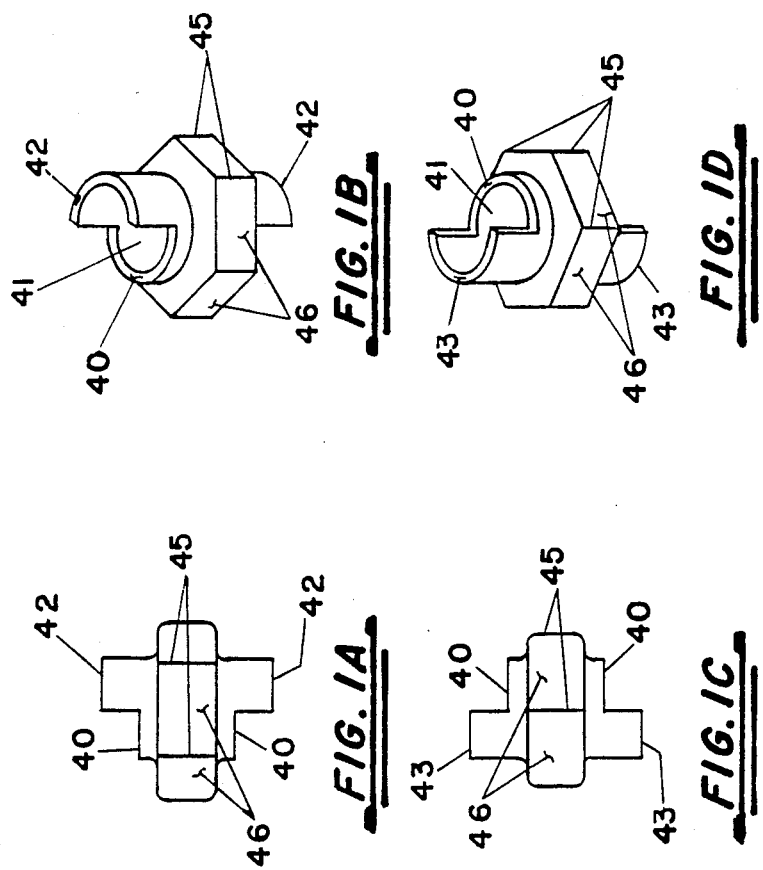

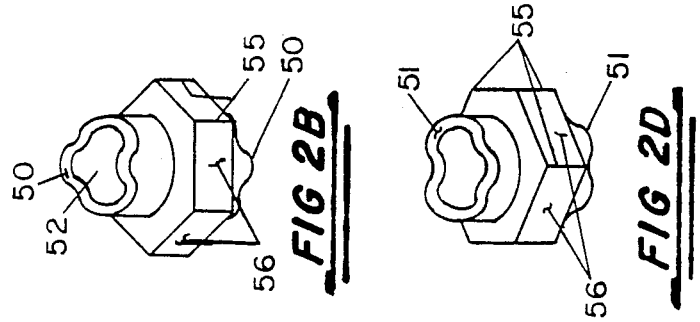
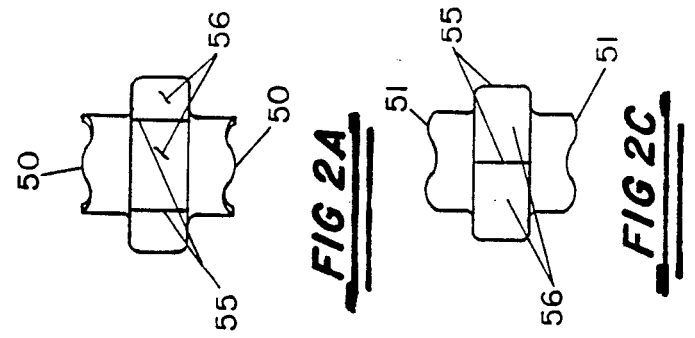

ORDERING APPARATUS HAVING WALLS WITH POLYGONAL ROTATORS

BACKGROUND OF THE INVENTION

In a wide spectrum of highly automated industries around the world, large volumes of cylindrical articles such as containers with relatively rigid side walls in constant flow have to be rearranged and ordered into a single file in a continuous flow. An ongoing need exists to efficiently single file these cylindrical articles for filling or packaging or other action such as inspecting, packaging, washing, rinsing, filling, labeling or capping within as small a working area as possible. Examples of these are the container manufacturers for and the actual end producers of the Food, Beverage, Brewery, Pharmaceutical, Oil and Paint Industries. The containers are of glass, plastic, metal (aluminum or steel), or composite. Automotive and like or related industries using assembly line techniques similarly require ordering of cylindrical pistons and other cylindrical parts for handling in automated systems in large quantities in their various assembling and machining processes.

In order to maximize a high degree of operating efficiency on these conveyor lines, a surge or accumulation area between each section of processing equipment is desirable, because momentary or intermittent disruptions in the feed in a production line would otherwise mean that within seconds each section of upstream process equipment would have to shut down. Without reserve areas of accumulation between each section, the entire production line would have to stop and start frequently, thus reducing the efficiency of the entire production operation.

Following each of these surge or accumulation areas, it is necessary to order the articles into a single file, in order to feed the articles to the next piece of downstream equipment. Many types of ordering systems have been proposed for this purpose.

Tice U.S. Pat. No. 3,934,706, patented Jan. 27, 1976, provides an apparatus for channeling a disorderly array of articles that are being transported on a conveyor into a uniform single row of articles. The apparatus includes a pair of spaced article confining walls. The walls converge towards each other in a direction corresponding to the flow of the articles. One of the walls has a plurality of longitudinally spaced vertically extending rows of beads provided thereon for engaging the disorderly array of articles as they pass therethrough and force such into single file while minimizing jamming. These beads are rotatably supported, so that as the articles of the disorderly array engage the beads while being moved forward on the conveyor, the beads tend to rotate, permitting the articles to be moved through the narrow end of the spaced walls without jamming. The wall with the beads thereon can be referred to as a live wall and takes the overall configuration of an abacus.

Beard U.S. Pat. No. 3,628,647, patented Dec. 21, 1971, notes that in the packaging of fluids within containers and in many other similar article-handling operations, it is frequently necessary to transform a plurality of articles advancing abreast, or as a disorganized mass, into a single row for operations incident to the packaging operation, or other operations in which the articles are being used. This arrangement of articles into a single row is fraught with problems, particularly where a very high speed of travel of the articles is involved.

Most of such articles have a natural tendency to nest or move into random relation, due in part to their complete or partial cylindrical configuration, and, so long as the articles move smoothly in the forward direction, the majority of the articles will feed into tandem relation under urging of converging guide rails normally employed for this purpose. However, jam-ups, or instances where the articles do not move into tandem relation but become jammed between the guide walls, are sufficiently frequent to materially interrupt the smooth operation of the packaging line or other article-handling operation, and to be of much concern.

Beard notes that many attempts have been made heretofore to provide apparatus which will prevent such jam-ups of articles between the guide rails or, in the event that such a jam-up occurs, to quickly dislodge the articles from the jammed condition so that they may continue to move forward. However, such previous attempts have been unsuccessful, in that they have either not been effective for preventing the jam-ups or dislodging the articles from between the guide rails, or have so materially interfered with forward movement of the articles as to completely negate the natural tendency of the articles to nest or move into tandem relation, and have thereby introduced ancillary problems. These latter attempts have usually involved spring-pressed guide bars normally disposed in the path of travel of the articles, and serving to retard their movement until the pressure of oncoming articles overcomes the spring bias thereof, to move them out of the way and permit the articles to advance. This retardant against the smooth forward movement of the articles encourages jam-ups, rather than obviating them.

Beard further notes that it has been previously proposed that jam-ups be prevented by substantially agitating the articles at all times as they move along their predetermined path of travel. However, this continuous agitation is highly undesirable, since it negates the natural tendency of the articles to nest or move into tandem relation, and since, in the case of fragile articles, breakage frequently occurs.

With the foregoing in mind, Beard provides an article combiner which arranges a plurality of articles advancing abreast in tandem relation to form a single row thereof without appreciably interfering with forward movement of the articles or their natural tendency to nest or move into tandem relation.

Converging guide means are provided for smoothly guiding a plurality of articles advancing abreast into a single row, with means being provided for quickly and effectively dislodging articles from a jam-up, should one occur.

Referring to FIG. 1, the terminal end portion of the first conveyor 12 and the beginning portion of the conveyor 13 form a part of the article combiner, which also includes first and second guide means 14, 15 which are disposed in converging relation above and adjacent to these portions of first conveyor 12 and second conveyor 13.

First guide means 14 includes agitating means 16 for agitating articles brought into contact therewith to free the articles from any jammed condition, and to facilitate arrangement thereof in tandem relation without appreciably interfering with forward movement thereof along the predetermined path of travel. Agitating means 16 comprises a bank of freely rotatable rollers 17 mounted for rotation about generally vertical axes extending parallel to the articles being conveyed by the conveyors. Rollers 17 are arranged in vertically extending rows and, as illustrated, there are three rollers in each row, with the rollers of adjacent rows being staggered relative to each other and with their adjacent peripheral portions overlapping.

First guide means 14 also includes buffer means 30 for normally maintaining articles out of contact with agitating means 16, so as normally not to permit agitating means 16 to appreciably interfere with the natural tendency of the articles to nest or move into tandem relation, but permitting contact of the articles with the agitating means 16 upon a predetermined resistance to further forward movement of certain articles, as upon a jam-up of articles between the first and second guide means, such that the agitating means 16 may agitate these articles and free them from any such jammed condition. As illustrated, buffer means 30 comprises a pair of vertically spaced-apart guide bars 31 preferably formed of nonscarring, friction-reducing material.

These devices have only limited success in accomplishing their task. The live wall of spherical beads of U.S. Pat. No. 3,934,706 actually does very little turning as the cylindrical articles pass by, and even when they do turn, there is no additional give or moment of movement resulting from the turning, due to their spherical shape. The same is true of the turning of the round rollers of U.S. Pat. No. 3,628,647. Even if the round rollers do turn upon tangential contact of the cylindrical articles, there would be no additional give or moment of movement resulting that would further encourage the cylindrical objects to slip by one another.

The only real give or agitating movement of the cylindrical articles as they are forced along the path of the guide walls made up of spherical beads or round rollers is the in and out movement caused by the peaks and valleys of the staggered rows of spherical beads or round rollers. This does, however, offer some improvement over the solid low-friction wall of that portion of U.S. Pat. No. 3,310,151. These types of solid low-friction shallow inclusive angle converging rails are most often very long, which also requires additional lengths of very costly horizontal conveyor components. Most often, however, many production plants do not have enough floor space to allow adequate single file room for these flat (7° or less) inclusive angle rails.

Since the 1970's there has been a substantial increase in the speed and number of cylindrical articles that flow per unit time through the production lines of the previously mentioned industries. As an example, in a single high speed brewery filling line, as many as 2,200 cans per minute are produced. This has exacerbated the ordering problem, to single file the cylindrical articles, and there is in fact no ordering and combining apparatus available today that is capable of satisfactory performance at such high speeds.

SUMMARY OF THE INVENTION

In accordance with the present invention, apparatus is provided that is capable of operating at high speed for ordering a flow of randomly arranged cylindrical articles into a single file, comprising, in combination, (1) a conveyor means having a conveyor surface composed of at least article single file and article accumulation portions;

(2) restraining walls along at least one side of the article accumulation portion defining (a) an article accumulation area where the articles are randomly disposed and susceptible to jamming or blockages; and (b) guide walls leading from the article accumulation area to the article single file portion of the conveyor surface, the guide walls comprising:

(i) a plurality of polygonal rotators (ii) arranged for rotation in substantially vertical stands of superimposed rotators;

(iii) the rotators having substantially straight side walls joined together at corners with angles between about 60° and about 150° and so oriented to each other in the stand that corners of some rotators project outwardly beyond side walls of other rotators in the stand for operative contact wity cylindrical articles on the conveyor surface whereby rotating polygonal rotators in the stands upon contact with cylindrical articles impart a rotational and vibrational movement to the articles and so inhibit jamming and blockages while the articles are rapidly moved and ordered into the single file.

The invention further provides a polygonal rotator that can be arranged for rotation in a substantially vertical stand of superimposed such rotators, the rotator having a body portion with substantially straight side walls joined together at corners with angles between about 60° and about 150° and a hub portion having a central aperture for reception of a central shaft supporting a stand of such rotators in interlocking rotating relationship, and an irregular surface on each side of the hub interlocking with a corresponding mating surface on the hub of an adjacent rotator, so as to maintain adjacent rotators in a selected orientation in a stand, for use as a guide wall and in apparatus for ordering a flow of randomly arranged cylindrical articles into a single file leading from the article accumulation area to the article single file portion of the conveyor surface, the stand comprising a plurality of polygonal rotators arranged for rotation in substantially vertical stands of superimposed rotators; the rotators having substantially straight side walls joined together at corners with angles between about 60° and about 150° and so oriented to each other in the stand that corners of some rotators project outwardly beyond side walls of other rotators in the stand for operative contact with cylindrical articles on the conveyor surface whereby rotating polygonal rotators in the stands upon contact with cylindrical articles impart a vibrational movement to the articles while the articles are rotating and so inhibit jamming and blockages while the articles are moved and ordered into the single file.

The invention also provides a guide wall for apparatus for ordering a flow of randomly arranged cylindrical articles into a single file leading to an article single file portion of the apparatus, comprising:

(i) a plurality of polygonal rotators (ii) arranged for rotation in substantially vertical stands of superimposed rotators;

(iii) the rotators having substantially straight side walls joined together at corners with angles between about 60° and about 150° and so oriented to each other in the stand that corners of some rotators project outwardly beyond side walls of other rotators in the stand for operative contact with cylindrical articles on the conveyor surface whereby rotating polygonal rotators in the stands upon contact with cylindrical articles impart a vibrational movement to the articles while the articles are rotating and so inhibit jamming and blockages while the articles are moved and ordered into the single file.

The drawings show preferred embodiments of the invention.

FIGS. 1A, 1B, 1C, 1D are detail views of a mating pair of superimposed abutting driven rotators of this invention, provided with mating flanges on the hub portion to fix them in the selected orientation with respect to each other in the stand, such as that of wall 23 of FIG. 3; of which:

FIG. 1A is a side view; and

FIG. 1B is a perspective view of one type of hexagonal rotator of the pair;

FIG. 1C is a side view; and

FIG. 1D is a perspective view of the mating hexagonal rotator of the pair.

FIGS. 2A, 2B, 2C, 2D are detail views of another mating pair of two abutting freely rotatable rotators, with mating hubs having hill-and-dale surfaces on the hub portion to fix them in the selected orientation with respect to each other in the stand, such as that of wall 24 of FIG. 3; of which:

FIG. 2A is a side view; and

FIG. 2B is a perspective view of one type of hexagonal rotator of the pair;

FIG. 2C is a side view; and

FIG. 2D is a perspective view of the mating hexagonal rotator of the pair.

Figure 3:
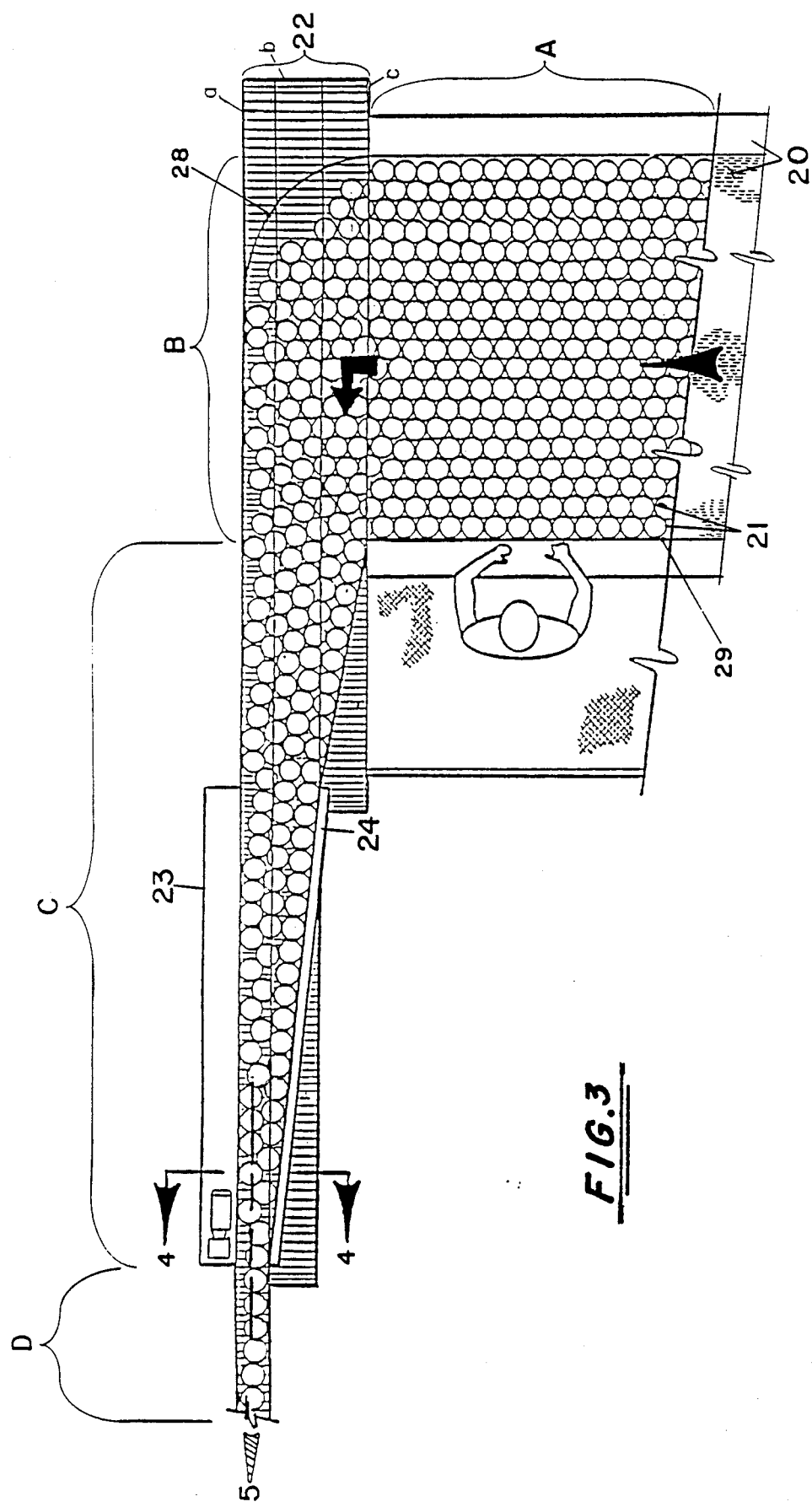
FIG. 3 is a plan view showing a bulk depalletizer utilizing rotators as shown in FIGS. 1 and 2 and capable of handling up to 2,200 bottles per minute, and ordering into single file this large mass flow of randomly arranged cylindrical bottles by conveying them past an array of guide walls according to the invention.

The polygonal rotators can be of any polygonal configuration, such as triagonal, tetragonal, square, pentagonal, hexagonal, heptagonal, octagonal, nonagonal or decagonal. An important contribution to the effectiveness of the rotators arises from their nonaligned arrangement in the guide wall stands, with corners of some rotators aligned with and projecting outwardly from sides of other rotators in the stand. As the number of sides in the polygon increases, so does the angle of the side walls at the corners, and the extent of the projection correspondingly decreases. Indeed, the polygon also more closely approaches the circular configuration of a cylinder, with no corners at all, which is undesirable, since a cylinder does not impart an effective mechanical thrusting effect to the articles it contacts. Thus, to maintain an effective mechanical thrusting effect in the stand, the angles at the corners of the polygons should be between about 60° and about 150°, and preferably are from about 60° to about 120°.

The polygonal rotators in a stand are mounted for rotation on a substantially vertical shaft or axle on which they rotate in a substantially horizontal plane. Adjacent rotators in a stand can be individually mounted, unattached to each other, or attached to each other in groups or throughout the stand, but preferably they are simply placed on the shaft or axle in abutting relationship, and are not only rotatable on or with the shaft but also are free to move up and down along the shaft, either individually or in groups, or throughout the stand. This up and down movement facilitates inhibiting jam-ups or breaking up jam-ups wherever they occur.

To make possible rotatable mounting of the rotators on a shaft or axle in a stand, while permitting up-and-down movement of rotators, and at the same time keying the rotators in a stand in the desired orientation with respect to each other, so that corners project outwardly beyond side walls of other rotators in the stand, the rotators are provided with specially shaped hub portions, with a central aperture for the shaft, and special contour of the portion facing the hub portion of the next adjacent oppositely-oriented rotator. Two illustrative types of facing hub surfaces are shown in FIGS. 1A, 1B, 1C, 1D, 2A, 2B, 2C and 2D.

The rotators of FIGS. 1A, 1B, 1C and 1D are of two hub types, AB and CD, keyed by the hub flange portions to retain them when adjacent in the desired non-aligned orientation. They are of molded plastic, but they can also be of metal, and are hexagonal. Central hubs 40 have central apertures 41 for rotatable mounting to a shaft such as 27 in FIGS. 3 to 6. Each hub AB has a flange 42 mating with an opposite flange 43 of hub CD. The oppositely flanged hubs when abutting position the rotators in the orientation shown in FIGS. 3 and 6 with corners 45 of each projecting beyond sides 46 of adjacent rotators. The hubs and flanges retain the rotators in the orientations shown when the shafts 27 driven, or when the rotators are free to rotate on the shafts when in contact with rotative articles.

FIGS. 2A, 2B, 2C and 2D show two types of individual rotators AB and CD in which the opposite facing hub surfaces 50 and 51 have an undulating or hill-and-dale configuration, and when abutting these mate to fix the adjacent rotators in the orientation shown in FIGS.

3 to 6, with corners 55 of each projecting beyond sides 56 of adjacent rotators. This type of keying linkage is suitable for free-rotating stands of rotators.

The plurality of rotators composing the stands have a height and diameter selected according to the height of the guide walls required by the height of the cylindrical articles and their diameter. If the articles are regular from top to bottom, all of the rotators can be of the same height and diameter. For ordering articles wide at the bottom and narrow at the top, such as bottles, the stands can have wider rotators at the top to ensure contact with the narrow necks of the bottles. Other variations will be apparent, such as to accommodate articles with constrictions between top and bottom portions, like pinch bottles.

A polygonal hexagon rotator having ½ inch long straight sides is the optimum size for use with the most commonly encountered size of cylindrical articles in today's food, beverage and brewery industries. This corresponds to a 0.568 inch long diametral diagonal between opposite corners of the hexagon, considering a further size reduction caused by a 1/32 inch radius on each corner. Thus, the perimeter circumference around this hexagon is 3.14×0.568 inch or 1.78 inch. The optimum effective range of ratios polygonal rotator diameter: the cylindrical article diameter is from 1:3 to 1:8, for a polygon of 0.568 inch diameter the cylindrical article diameter can range from about 1.70 to about 4.54 inches.

For a given diameter or size of polygonal rotator as the number of sides decreases and the enclosed angle decreases, the size or diameter of the cylindrical articles that can be ordered by such rotators increases. For example, the diameter of a nominal mid-range cylindrical article that can be ordered by a regular hexagonal rotator with a perimeter circumferential diameter of 0.568 inch is 5.5×0.568 or 3.124 inches in diameter. (The 5.5 is the mid-range of the 1:3, 1:5.5, 1:8 ratio range.) As the diameter of a further example, a nominal mid-range cylindrical article that can be ordered by a pentagonal rotator with an identical perimeter circumference or diameter is 3.124 inches ×1.1 or 3.44 inches. For a square rotator, it is 3.44×1.1 or 3.78 inches.

Preferred size relationships between polygonal rotators and cylindrical articles can also be shown by graphs, as illustrated by FIGS. 8, 10, 12 and 14, which are discussed later.

The stands are made up of individual rotators such as those of FIGS. 1 and 2 assembled in such a way that corners of some rotations project outwardly from sides of other rotators. The projections can be centered on the sides, or offset towards one corner. If one orientation be considered as A, and B be considered as another, it will be seen that if the polygons of the stand are the same, corners of the B set will project from sides of the A set, and corners of the A set will project from sides of the B set. The rotators can be arranged in rows in the pattern ABABAB, etc. with alternating rotators of each orientation, or with several rotation of each orientation together, as AABBAABB, etc., or irregularly, as AABBBAABBAAABB, etc. The precise arrangement selected depends upon the configuration of the articles, as will be apparent.

The rotators in the stand are held in the selected orientation by any conventional means. As shown in FIGS. 1 and 2, the rotators can be provided with facing surfaces configured to mate with or keyed with the surfaces of adjacent rotators, so as to lock them together, when this expedient is used, the rotators can be free to move up and down, independently, on the shafts. If all or some of the rotators can be attached together, for movement en masse, they can for example be bonded together by an adhesive, or by welding or fusing.

DESCRIPTION OF A PREFERRED EMBODIMENT

The preceding general description is exemplified by the embodiments shown in FIGS. 3 to 7 of the drawings.

Figure 4:
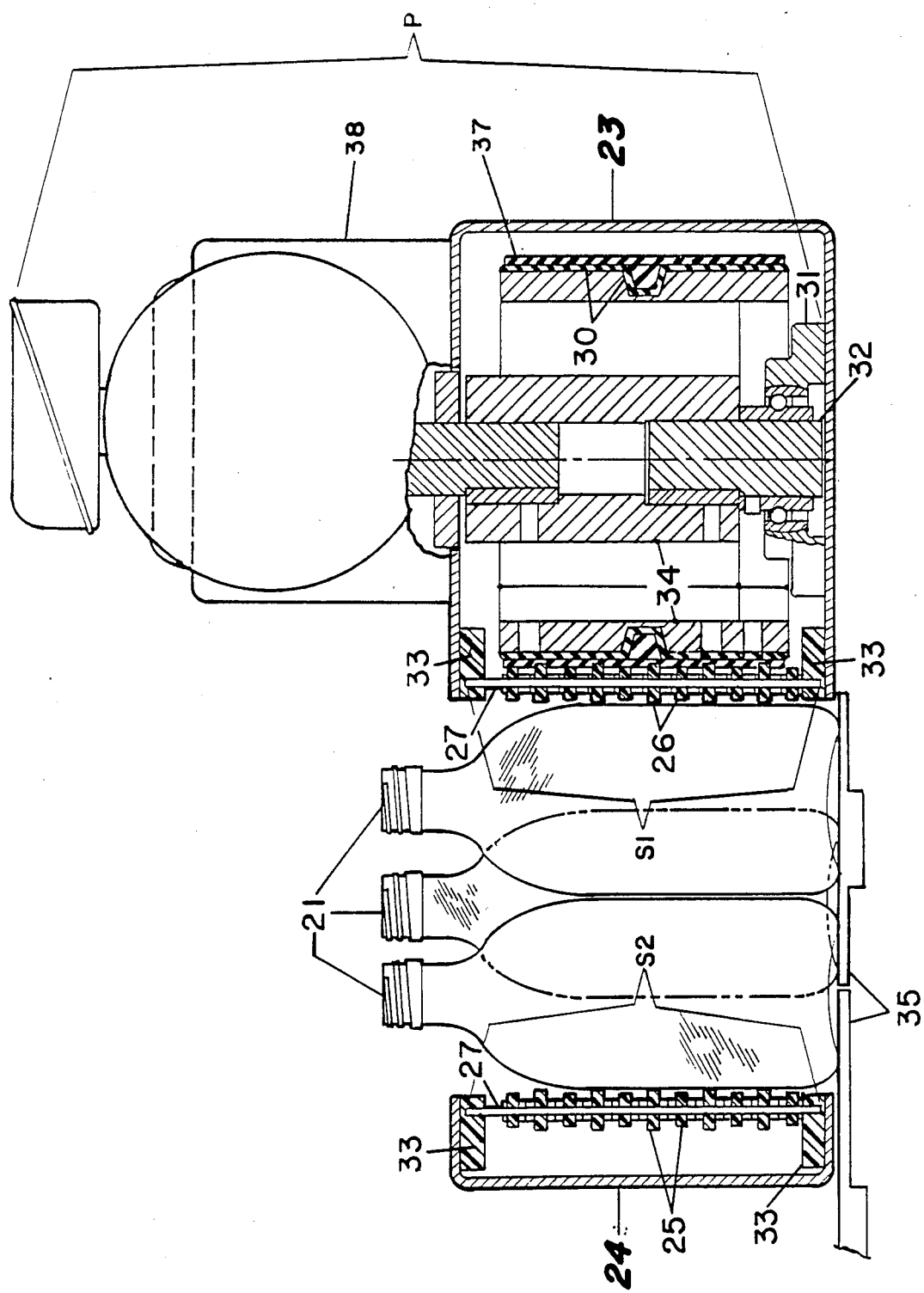
FIG. 4 is an enlarged cross-section of FIG. 3, taken substantially along line 4—4, cutting through the drive end components, and looking in the direction of the arrows, showing in detail two stands of polygonal rotators composing the guide walls.
Figure 5:
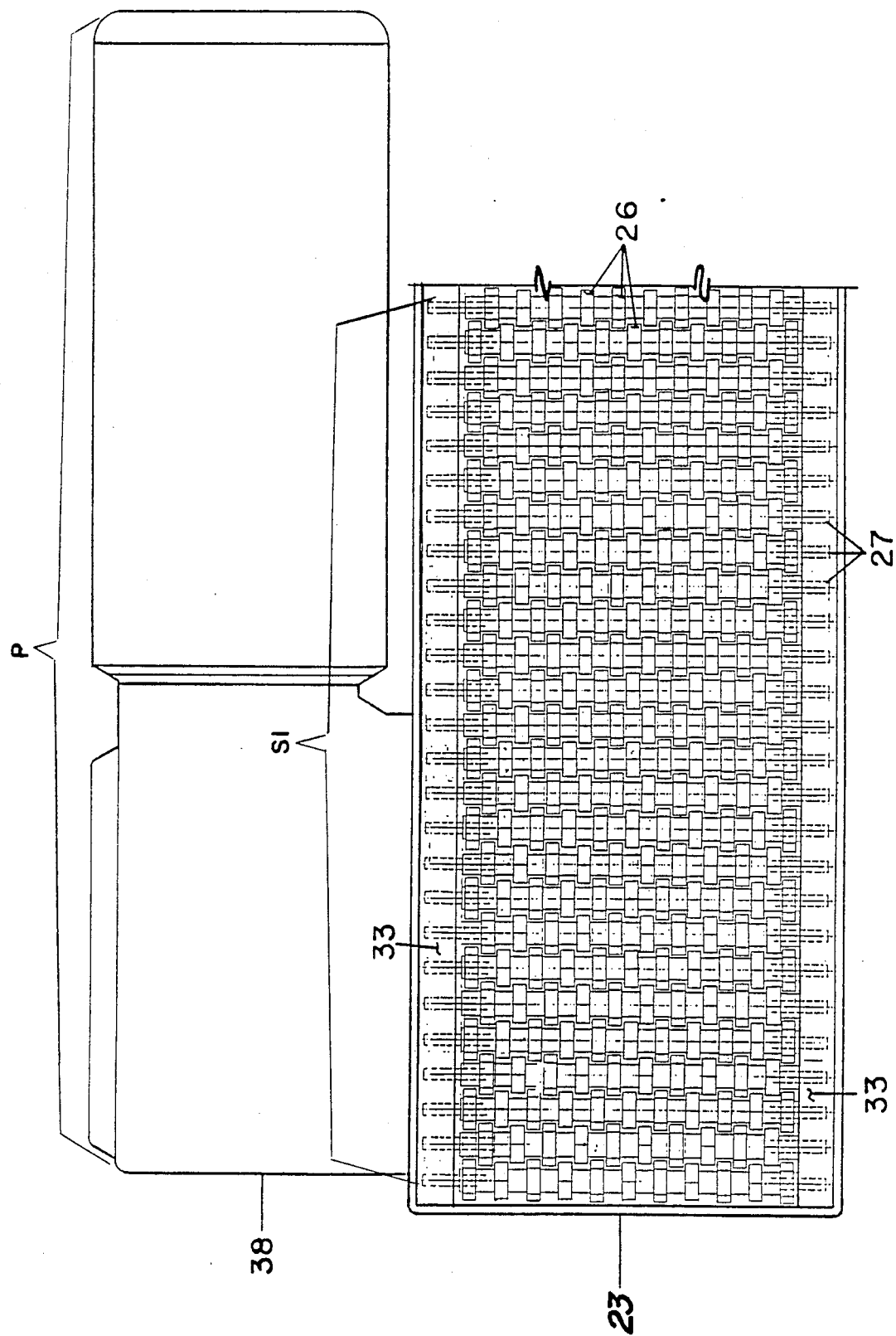
FIG. 5 is a front view of the guide wall 23 of FIG. 3, showing how the superimposed polygonal rotators are oriented with respect to each other in the stands.
Figure 6:
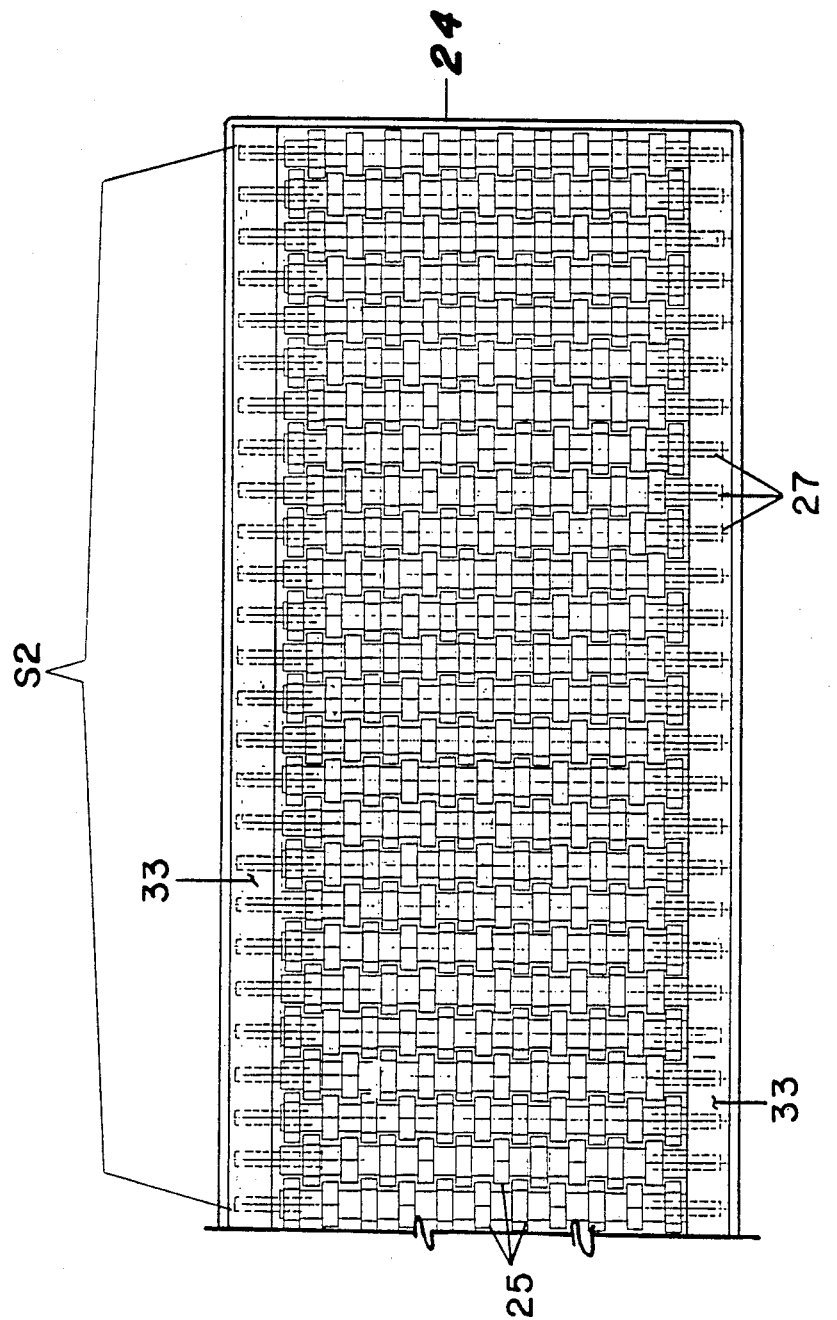
FIG. 6 is a front view of the guide wall 24 of FIG. 3, in which the rotators are free to rotate and not driven.

These Figures, as best seen in FIG. 3, illustrate a bulk depalletizer 20 which feeds cylindrical bottles 21 or similar articles from the loading area A to the accumulation or collection area B. This bulk depalletizer 20 has a motor driven conveyor 22, and is capable of feeding up to 2,200 bottles per minute into the production system at 5. These bottles 21 are moved by the bulk depalletizer 20 from area A onto the three-belt 22a, 22b, 22c cross conveyor into area B. The area B has restraining walls 28, 29 which confine the bottles as they are moved to the left by the conveyors 22, as illustrated by the arrow, and thus are forced into the convergent area C to order themselves into a single file at D. Within portions of areas C and D and abutting the ends of walls 28, 29 are positioned guide walls 23 and 24 in accordance with the invention, made up of stands S1, S2, best seen in FIGS. 4, 5 and 6, of driven and freely rotatable polygonal rotators of FIG. 1. The stands S1 in wall 23 are rotated by a power source P, as shown in FIGS. 4 and 5. The stands S2 in wall 24 are not driven, but are freely rotatable as shown in FIG. 6.

Figure 7:
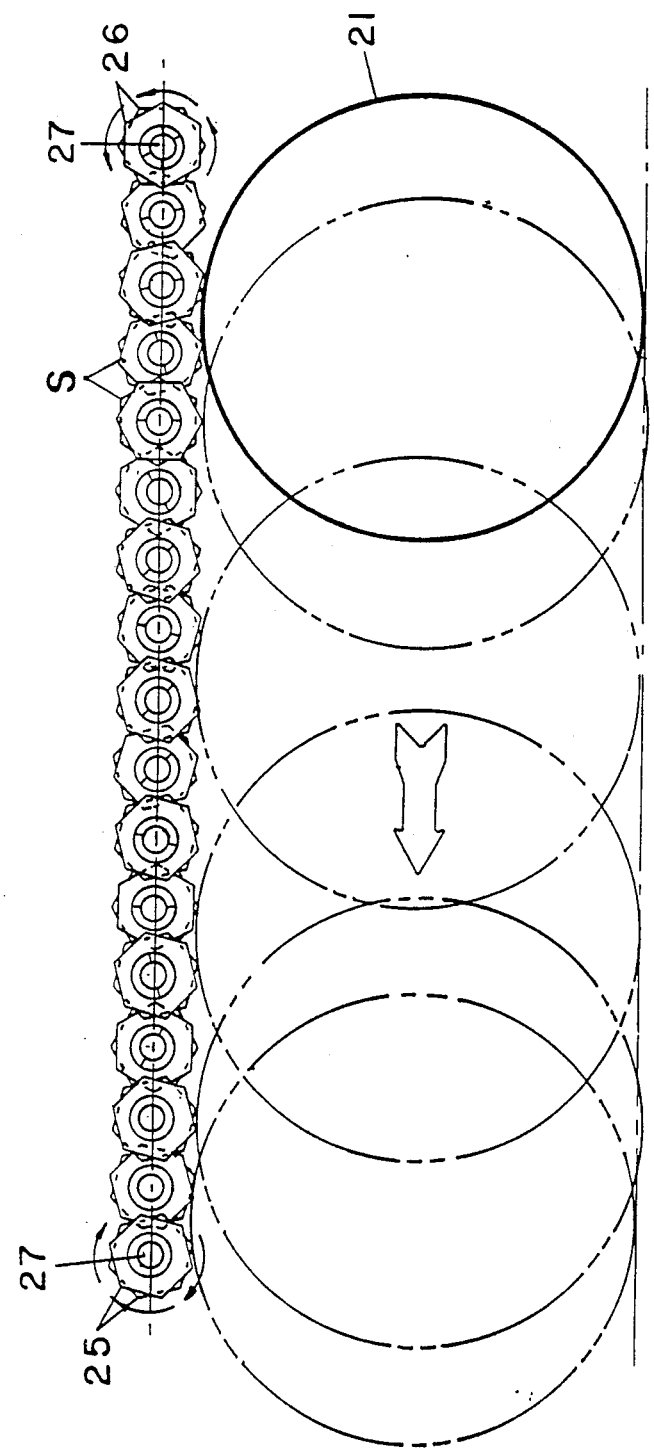
FIG. 7 is a plan view showing the interdigitated relationship between hexagonal rotators of adjacent stands and their mode of contact with cylindrical articles in a preferred size ordered thereby.

As seen in FIG. 4, the stands S1 in wall 23 have rotators with hubs of the type of FIG. 1, with central apertures 41 through which pass shafts 27, with the rotators held thereon by the mating flanges 42, 43 in the orientation shown in FIG. 7. The rotators are molded from a low friction polyacetal (long wear life) non abrasive plastic, with the corners of the rotators rounded. The shafts 27 are held in mounting bars 33, made from an ultra high molecular weight polyethylene plastic material.

The drive system for the stands includes main drive pulley 34 made of aluminum (anodized), and covered with a vulcanized USDA grade synthetic rubber material 30, a flat drive belt 37, made of a USDA approved synthetic rubber material, with a "v" guide molded thereto, a shaft 32, a bearing 31 and drive motor 38.

In operation, the bottles 21 in random arrangement are carried from areas A, B on the conveyors 22a, 22b, 22c into the convergent ordering area C, where they encounter guide walls 23, 24 and are rotated by the driven rotating stands S1 of rotators in wall 23. The rotating bottles in contact with the stands at 23 in turn rotate bottles with which they are in contact away from the wall, and the rotating movement is thus transmitted by the bottles all the way across area C to the stands S2 of wall 24, which then begin to rotate, since they are freely rotatable. At the same time, the stands of walls 23 and 24, due to the projecting corners of adjacent rotators, impart an irregular vibratory movement to the bottles, also transmitted but with diminishing force from each wall 23, 24 towards the center of area C. This rotational and vibratory movement facilitates ordering of the bottles into a single file by the time the bottles reach area D. In the course of this convergence wall 24 gradually shoves all of the bottles from conveyor 22c to conveyor 22b and then conveyor 22a, wide enough for the single file. Thus, conveyors 22c and 22b are much shorter than 22a.

Figure 8:
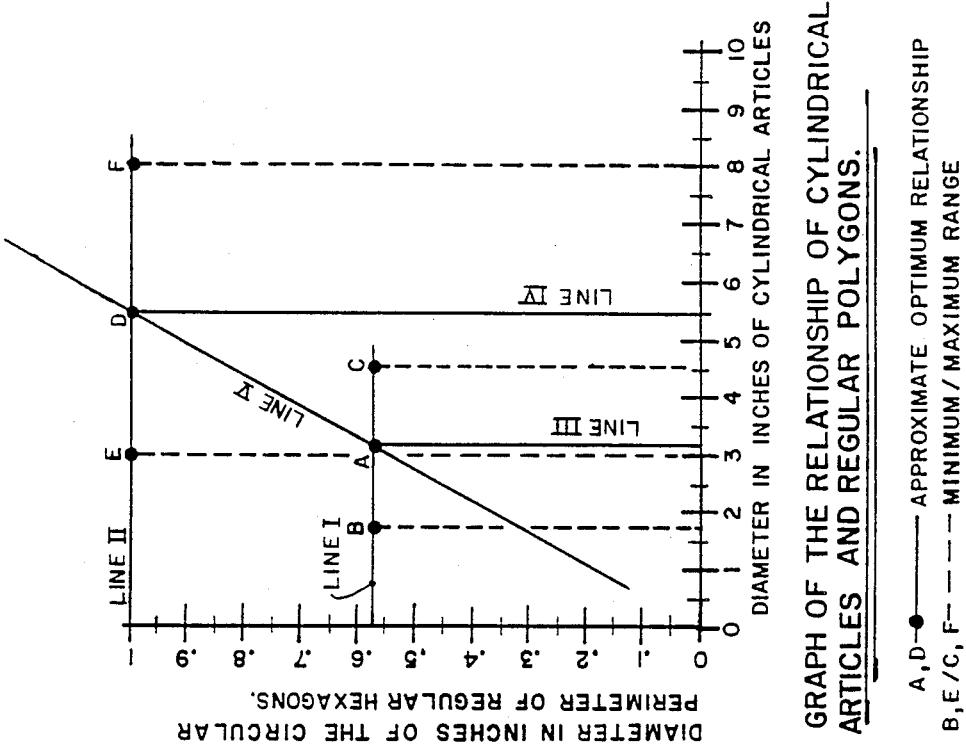
FIG. 8 is a graph illustrating the range of size of cylindrical articles ordered by two preferred sizes of the hexagonal rotators of FIGS. 3 and 7.

Preferred size relationships between polygonal rotators and cylindrical articles in the stands shown in FIGS. 3 to 7 are shown by the graphs, of FIGS. 8, 9, 10, 11, 12, 13, 14 and 15:

FIG. 8 specifically illustrates in dashed lines B, C, E, F the range of upper and lower size limits of cylindrical articles that can be ordered by hexagonal rotators of 0.568 inch diameter (line I) and of 1 inch diameter (line II). At points A and D, which are the intersections with lines I and II of the solid vertical lines III, IV, are the preferred sizes or diameters of cylindrical articles which are to be ordered by hexagonal rotators with circumferential perimeter diameters of 0.568 and 1 inch, respectively; these are 3.12 and 5.50 inches, respectively. The minimum and maximum lines for cylindrical articles ordered by these rotation are indicated by points B, E and C, F, which are 1.7 and 3.0, and 4.54 and 8.0 inches, respectively. The diagonal line V indicates that this ratio is constant and continues on this slope.

FIG. 7 is a top view showing stands S of hexagonal rotators of 0.568 inch diameter ordering bottles of 3.12 inch diameter, the preferred optimum sizes shown in FIG. 8.

Figure 9:
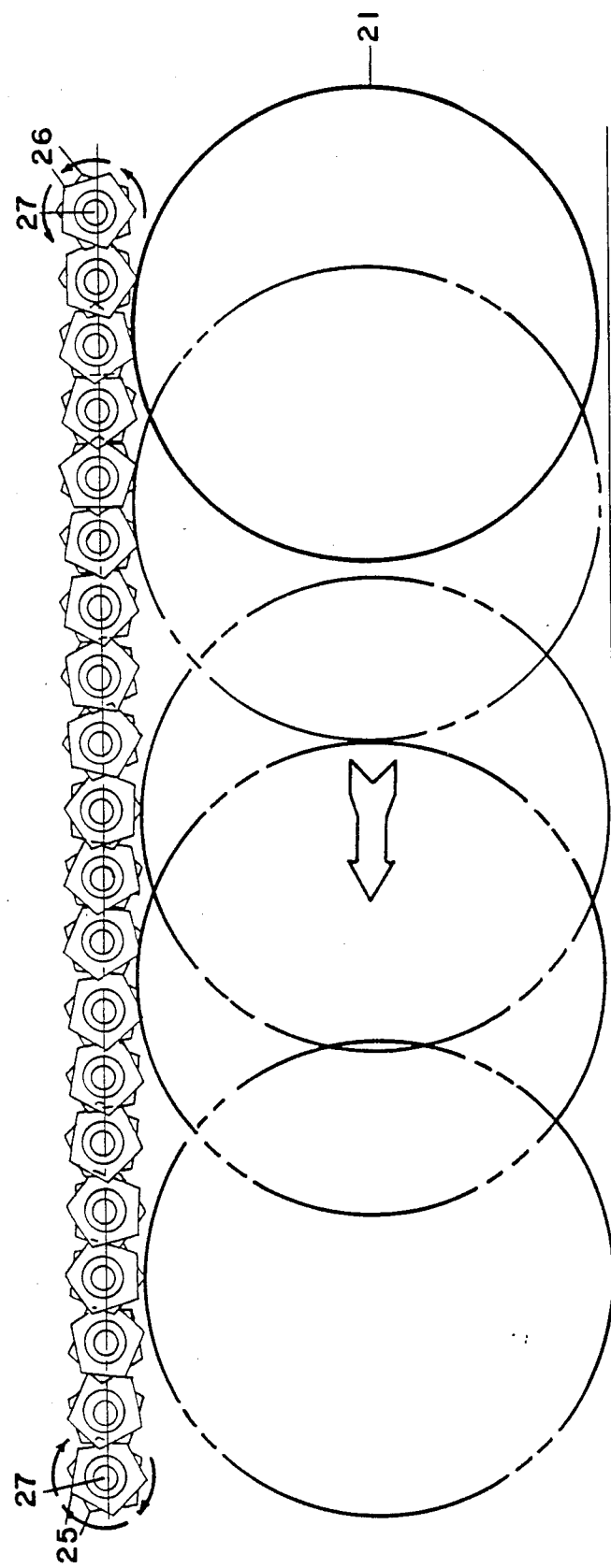
FIG. 9 is a plan view showing the interdigitated relationship of stands of pentagonal rotators of a preferred size, and cylindrical articles of a preferred size, ordered thereby.
Figure 10:
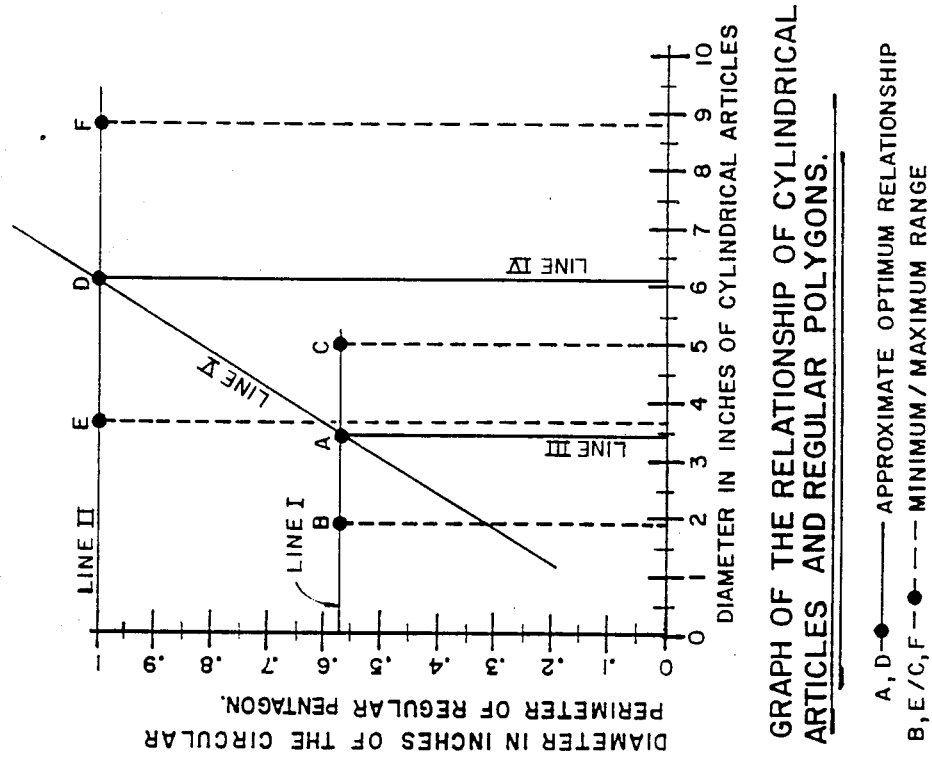
FIG. 10 is a graph illustrating the range of sizes of cylindrical articles ordered by two preferred sizes of pentagonal rotators.

FIG. 9 is a top view showing stands S of pentagonal rotators of 0.568 inch diameter ordering bottles of 3.44 inch diameter, the preferred optimum sizes shown in FIG. 10.

FIG. 10 specifically illustrates in dashed lines BCEF the range of upper and lower size limits of cylindrical articles that can be ordered by pentagonal rotators of 0.568 inch diameter (line I) and of 1 inch diameter (line II).

At points A and D which are the intersections with lines I and II of the solid vertical lines III, IV are the preferred sizes or diameters of cylindrical articles which can be ordered by pentagonal rotators with circumferential perimeter diameters of 0.568 and 1 inch, respectively; these are 3.44 and 6.05 inches, respectively. The minimum and maximum limits for cylindrical articles ordered by these rotators are indicated by points B, F and C, F, which are 1.87 and 3.3 and 4.99 and 8.8 inches, respectively. The diagonal line V indicates that this ratio is constant, and continues on this slope.

Figure 11:
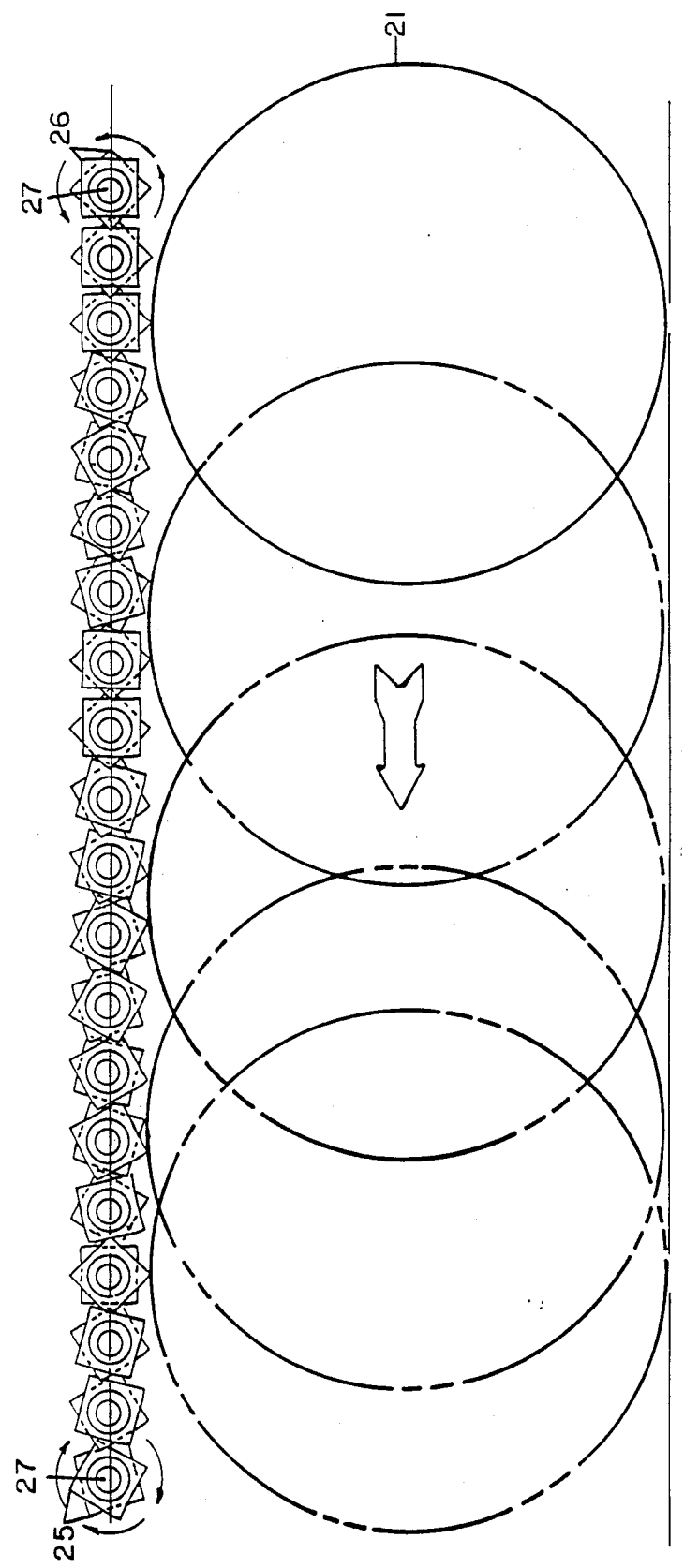
FIG. 11 is a plan view showing the interdigitated relationship of stands of square rotators of a preferred size, and cylindrical articles of a preferred size ordered thereby.
Figure 12:
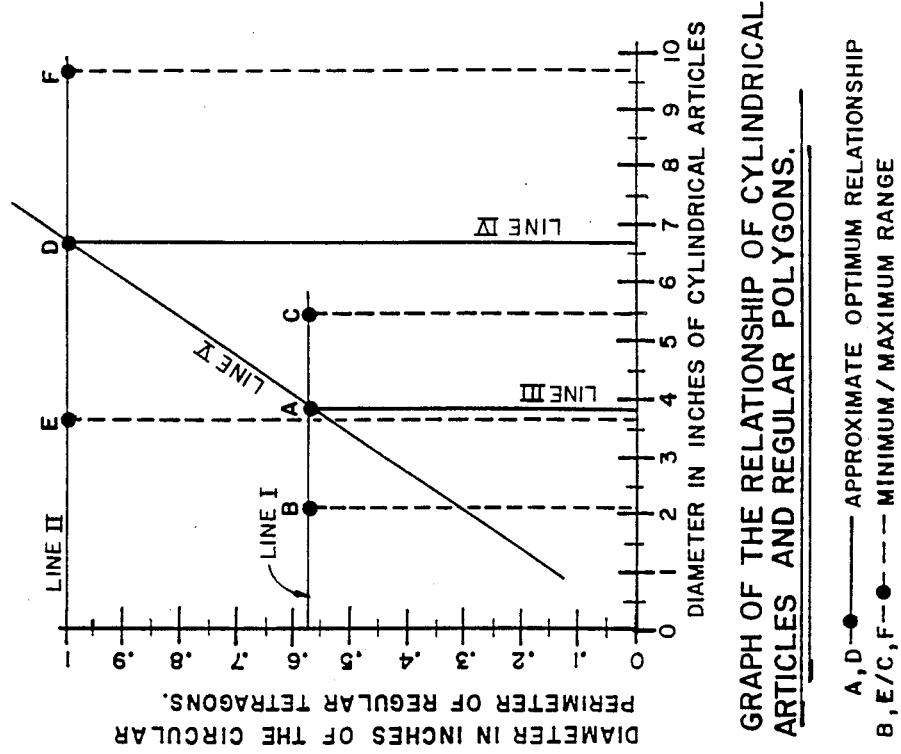
FIG. 12 is a graph illustrating the range of sizes of cylindrical articles ordered by two preferred sizes of square polygonal rotators.

FIG. 11 is a top view showing stands S of square rotators of 0.568 inch diameter ordering bottles of 3.78 inch diameter, the preferred optimum sizes shown in FIG. 12.

At points A and D which are the intersections with lines I and II of the solid vertical lines III and IV are the preferred sizes or diameters of cylindrical articles which are to be ordered by tetragonal rotators with circumferential perimeter diameters of 0.568 and 1 inch, respectively; these are 3.78 and 6.66 inches, respectively. The minimum and maximum limits of cylindrical articles ordered by these rotators are indicated by points B, F and C, F which are 2.05 and 3.63 and 5.49 and 9.68 inches, respectively. The diagonal line V indicates that this ratio is constant, and continues on this slope.

Figure 13:
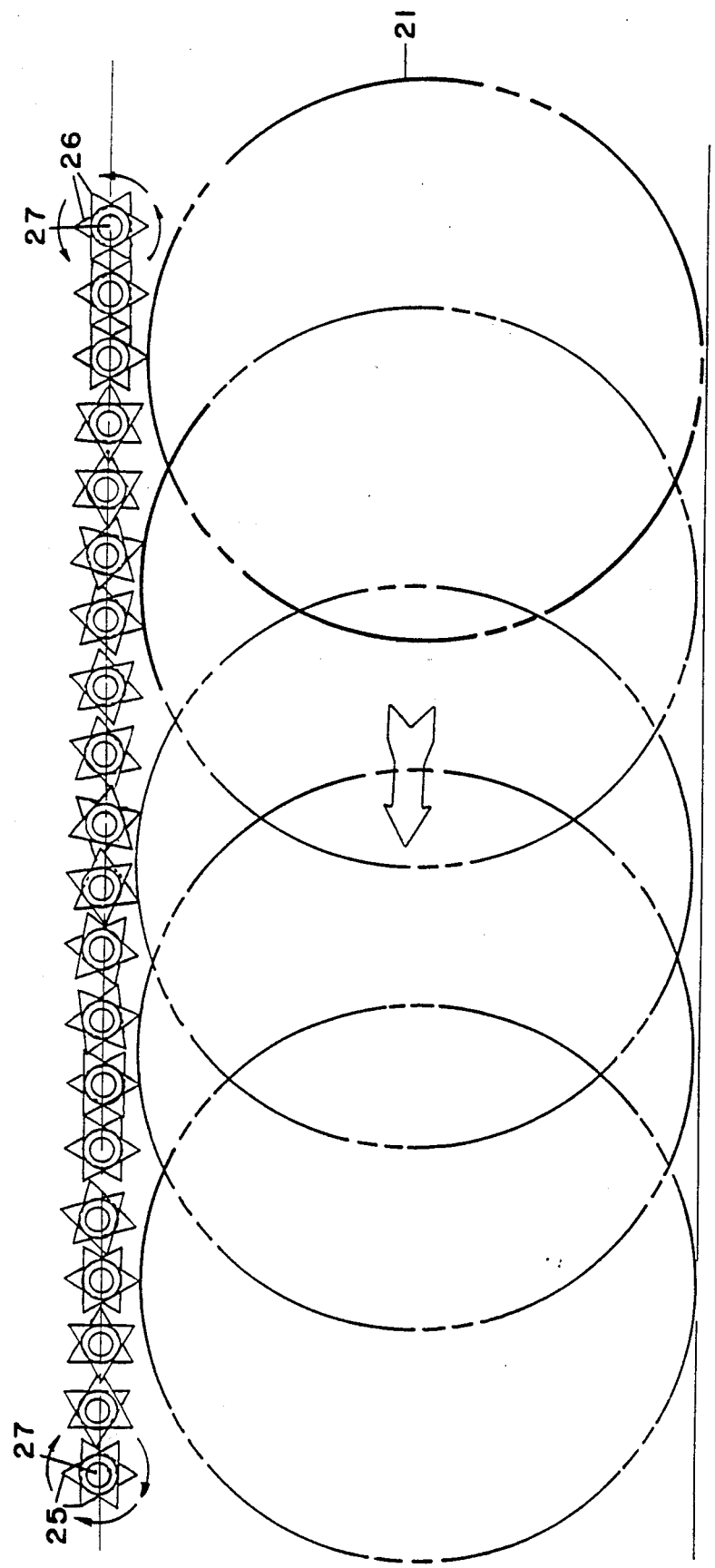
FIG. 13 is a plan view showing the interdigitated relationship of stands of triagonal rotators of a preferred size and cylindrical articles of a preferred size ordered thereby.
Figure 14:
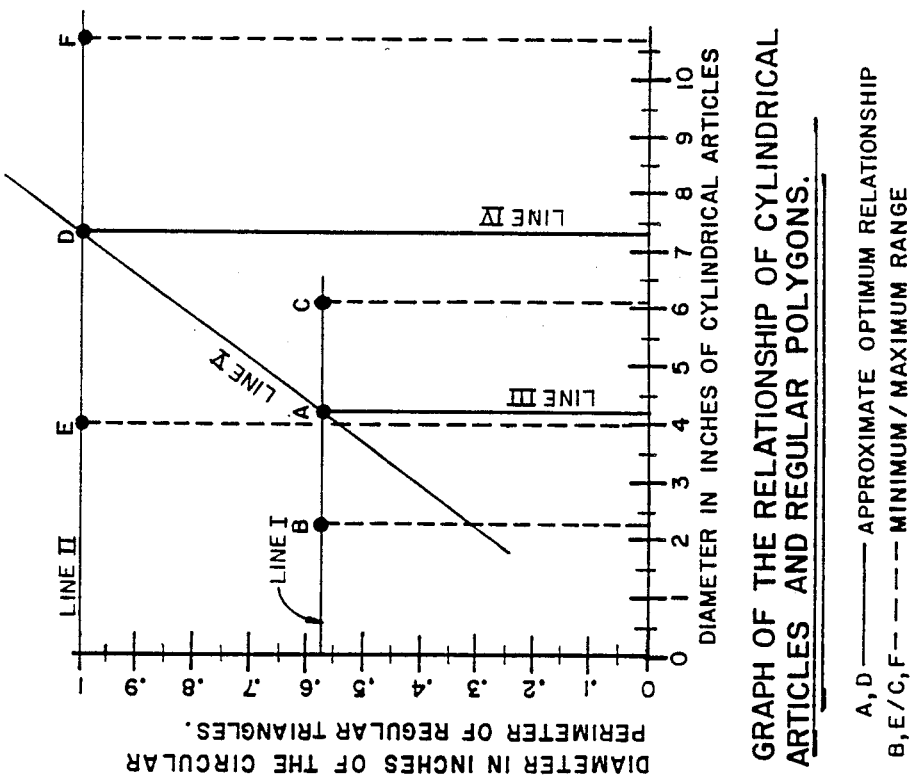
FIG. 14 is a graph illustrating the range of sizes of cylindrical articles ordered by two preferred sizes of triagonal rotators.

FIG. 13 is a top view showing stands S of triagonal rotators of 0.068 inch diameter ordering bottles of 3.78 inch diameter, the preferred optimum sizes shown in FIG. 14.

At points A and D, which are the intersections with lines I and II of the solid vertical lines III and IV are the preferred sizes or diameters of cylindrical articles which are to be ordered by triangonal rotators with circumferential perimeter diameters of 0.568 and 1 inch, respectively; these are 4.16 and 7.32 inches, respectively. The minimum and maximum limits of cylindrical articles ordered by these rotators are indicated by points B, F and C, F, which are 2.26 and 3.99 and 6.04 and 10.65 inches, respectively. The diagonal line V indicates that this ratio is constant, and continues on this slope.

Accordingly, from the graphs of FIGS. 8, 10, 12 and 14 one skilled in the art can develop similar graphs for corresponding polygonal rotators of other sizes, and of other polygonal shapes. Trial and error experimentation will confirm the validity of any such relationships.

In like manner, it is possible to develop a range of sizes for polygonal rotators of any selected configuration that can order cylindrical articles of a selected size.

While the articles being ordered are referred to herein as cylindrical, it will be understood that the polygonal rotators can order articles of any external configuration that is substantially or approximately cylindrical, including polygonal articles having enclosed angles greater than 150°.

Having regard to the foregoing disclosure, the following is claimed as the inventive and patentable embodiments thereof:

1. Apparatus for ordering a flow of randomly arranged cylindrical articles into a single file, comprising, in combination,
   (1) conveyor means having a conveyor surface composed of at least article single file and article accumulation portions;
   (2) restraining walls along at least one side of the article accumulation portion defining
      (a) an article accumulation area where the articles are randomly disposed and susceptible to jamming or blockages; and
      (b) guide walls leading from the article accumulation area to the article single file portion of the conveyor surface, the guide walls comprising:
         (i) a plurality of polygonal rotators;
         (ii) arranged for rotation in substantially vertical stands of superimposed rotators;
         (iii) the rotators having substantially straight side walls joined together at corners with angles between about 60° and about 150° and so oriented to each other in the stand that corners of some rotators project outwardly beyond side walls of other rotators in the stand for operative contact with cylindrical articles on the conveyor surface whereby rotating polygonal rotators in the stands upon contact with cylindrical articles impart a vibrational movement to the articles while the articles are rotating and so inhibit jamming and blockages while the articles are moved and ordered into the single file.

2. Apparatus according to claim 1 comprising power means for rotating the rotators so as to rotate the articles in contact therewith in the opposite direction.

3. Apparatus according to claim 1 in which the rotators are mounted in stands for free rotation in the opposite direction upon contact with moving articles along the guide wall.

4. Apparatus according to claim 1 in which each rotator comprises a hub portion having a central aperture and an irregular surface on each side of the hub interlocking with a corresponding mating surface on the hub of the adjacent rotator so as to maintain adjacent rotators in the stated relationship, and a central shaft supporting the stands of rotators in interlocking rotating relationship.

5. Apparatus according to claim 4 in which the irregular hub surfaces have raised and depressed portions.

6. Apparatus according to claim 5 in which the portions have straight sides.

7. Apparatus according to claim 5 in which the portions have curved sides.

8. A polygonal rotator that can be arranged for rotation in a substantially vertical stand of superimposed such rotators; the rotator having a body portion with substantially straight side walls joined together at corners with angles between about 60° and about 150° and a hub portion having a central aperture for reception of a central shaft supporting a stand of such rotators in interlocking rotating relationship, and an irregular surface on each side of the hub interlocking with a corresponding mating surface on the hub of an adjacent rotator, so as to maintain adjacent rotators in a selected orientation in a stand.

9. A polygonal rotator according to claim 8 in which the irregular hub surfaces have raised and depressed portions.

10. A polygonal rotator according to claim 9 in which the portions have straight sides.

11. A polygonal rotator according to claim 9 in which the portions have curved sides.

12. A polygonal rotator according to claim 9 in which the raised and depressed portions constitute flanges extending outwardly from the hub.

13. A polygonal rotator according to claim 9 in which the raised and depressed portions constitute hill-and-dale surfaces on the hub.

14. A guide wall for apparatus for ordering a flow of randomly arranged cylindrical articles into a single file leading to an article single file portion of the apparatus, comprising:
(i) a plurality of polygonal rotators;
(ii) arranged for rotation in substantially vertical stands of superimposed rotators;
(iii) the rotators having substantially straight side walls joined together at corners with angles between about 60° and about 150° and so oriented to each other in the stand that corners of some rotators project outwardly beyond side walls of other rotators in the stand for operative contact with cylindrical articles on the conveyor surface; whereby rotating polygonal rotators in the stands upon contact with cylindrical articles impart a vibrational movement to the articles while the articles are rotating and so inhibit jamming and blockages while the articles are moved and ordered into the single file.

15. A guide wall according to claim 14 comprising power means for rotating the rotators so as to rotate the articles in contact therewith in the opposite direction.

16. A guide wall according to claim 14 in which the rotators are mounted in stands for free rotation in the opposite direction upon contact with moving articles along the guide wall.

17. A guide wall according to claim 14 in which each rotator comprises a hub portion having a central aperture and an irregular surface on each side of the hub interlocking with a corresponding mating surface on the hub of the adjacent rotator so as to maintain adjacent rotators in the stated relationship and a central shaft supporting the stands of rotators in interlocking rotating relationship.

18. A guide wall according to claim 17 in which the irregular hub surfaces have raised and depressed portions.

19. A guide wall according to claim 18 in which the portions have straight sides.

20. A guide wall according to claim 18 in which the portions have curved sides.

21. A stand for use as a guide wall and in apparatus for ordering a flow of randomly arranged cylindrical articles into a single file leading from the article accumulation area to the article single file portion of the conveyor surface, the stand comprising:
(i) a plurality of polygonal rotators
(ii) arranged for rotation in substantially vertical stands of superimposed rotators;
(iii) the rotators having substantially straight side walls joined together at corners with angles between about 60° and about 150° and so oriented to each other in the stand that corners of some rotators project outwardly beyond side walls of other rotators in the stand for operative contact with cylindrical articles on the conveyor surface whereby rotating polygonal rotators in the stands upon contact with cylindrical articles impart a vibrational movement to the articles while the articles are rotating and so inhibit jamming and blockages while the articles are moved and ordered into the single file.

22. A stand according to claim 21 comprising power means for rotating the rotators so as to rotate the articles in contact therewith in the opposite direction.

23. A stand according to claim 21 in which the rotators are mounted in stands for free rotation in the opposite direction upon contact with moving articles along the guide wall.

24. A stand according to claim 21 in which each rotator comprises a hub portion having a central aperture and an irregular surface on each side of the hub interlocking with a corresponding mating surface on the hub of the adjacent rotator so as to maintain adjacent rotators in the stated relationship and a central shaft supporting the stands of rotators in interlocking rotating relationship.

25. A stand according to claim 24 in which the irregular hub surfaces have raised and depressed portions.

26. A stand according to claim 25 in which the portions have straight sides.

27. A stand according to claim 25 in which the portions have curved sides.

* * * * *